Figure 1:
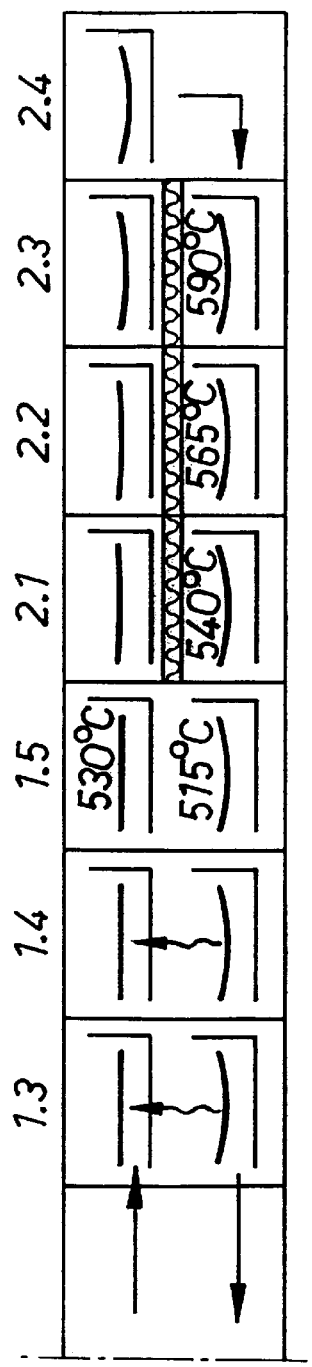

United States Patent
Salonen

[19]

[11] Patent Number: 5,902,367
[45] Date of Patent: May 11, 1999

[54] METHOD FOR TRANSFERRING MOULD-CARRYING WAGONS FOR GLASS SHEETS IN A BENDING FURNACE FOR GLASS SHEETS AND BENDING FURNACE FOR GLASS SHEETS

[75] Inventor: Tapio Salonen, Tampere, Finland

[73] Assignee: Tamglass Engineering Oy, Tampere, Finland

[21] Appl. No.: 08/620,076

[22] Filed: Mar. 21, 1996

[30] Foreign Application Priority Data

Apr. 4, 1995 [FI] Finland ..................................... 951585

[51] Int. Cl.⁶ ....................................................... C03B 5/24
[52] U.S. Cl. .............................. 65/29.1; 65/104; 65/107; 65/163; 65/273; 65/287
[58] Field of Search ............................. 65/104, 106, 107, 65/273, 287, 289, 29.1, 163

[56] References Cited

U.S. PATENT DOCUMENTS

| | | | |
|---|---|---|---|
| 4,199,641 | 4/1980 | Petrella | 65/104 |
| 4,497,645 | 2/1985 | Peltonen | 65/107 |
| 4,617,043 | 10/1986 | Reunamaki | 65/29 |
| 4,986,842 | 1/1991 | Peltonen | 65/104 |

*Primary Examiner*—Stanley S. Silverman
*Assistant Examiner*—Sean Vincent
*Attorney, Agent, or Firm*—Royston, Rayzor, Vickery, Novak & Druce, L.L.P.

[57] ABSTRACT

A method for transferring mould-carrying wagons in a bending furnace for glass sheets as well as to a bending furnace for glass sheets, comprising preheating stations (1.3, 1.4, 1.5) and more than two bending stations (2.1, 2.2, 2.3, 2.4) in succession and therebelow a number of cooling stations (3.1, 3.2, 3.3, 3.4), a first number of mould-carrying wagons (3, 4) on an upper track (1) and a second number of mould-carrying wagons (3, 4) on a lower track (2), an end wall (4) of the mould-carrying wagons defining said preheating, bending and cooling stations when the mould-carrying wagons (3, 4) are stationary. After a bending, the mould-carrying wagon (3, 4) is transferred under one or more bending stations (2.3, 2.2) to a location directly below the first bending station (2.1) or the final preheating station (1.5).

8 Claims, 1 Drawing Sheet

METHOD FOR TRANSFERRING MOULD-CARRYING WAGONS FOR GLASS SHEETS IN A BENDING FURNACE FOR GLASS SHEETS AND BENDING FURNACE FOR GLASS SHEETS

The present invention relates to a bending furnace for glass sheets, comprising preheating stations and more than two bending stations in succession and therebelow a number of cooling stations, a first number of mould-carrying wagons on an upper track and a second number of mould-carrying wagons on a lower track, an end wall of the mould-carrying wagons defining said preheating, bending and cooling stations when the mould-carrying wagons are stationary. The invention relates also to a method for transferring mould-carrying wagons in this type of bending furnace.

Such a bending furnace is prior known from Patent publication U.S. 4,497,645. The furnace has proved highly useful and energy efficient since the heat of glass sheets cooling on the lower track can be exploited for the heating of glass sheets to be heated on the upper track. In this type of furnace, the production capacity or output can be increased by increasing the number of successive stations, whereby the stopping times of wagons within the stations are respectively reduced. A furnace including more than two bending stations in succession involves the problem that the glass cools below the bending stations to such a degree that, by the time of its arrival below the final preheating station, the glass has a temperature which is colder than that of the glass thereabove to be preheated. Thus, the glass underneath cools the bottom glass of a pair of glasses thereabove to be preheated. The situation has been depicted in the accompanying FIG. 1, which illustrates by way of example the cooling of glass on the lower track below bending stations 2.1, 2.2, 2.3.

An object of the invention is to provide a method and a furnace, capable of preventing the excessive cooling of glass prior to the arrival of glass below the final preheating block.

This object is achieved by a method of the invention, such that, after a bending operation, the mould-carrying wagon is transferred under one or more bending stations to a location directly below the first bending station or the final preheating station.

Thus, the glass does not have enough time for excessive cooling prior to its arrival below a final preheating block 1.5 but, instead, the cooling glass delivers heat to the glass being preheated in station 1.5.

The characterizing features of a bending furnace of the invention are set forth in the annexed claim 3.

Figure 2:
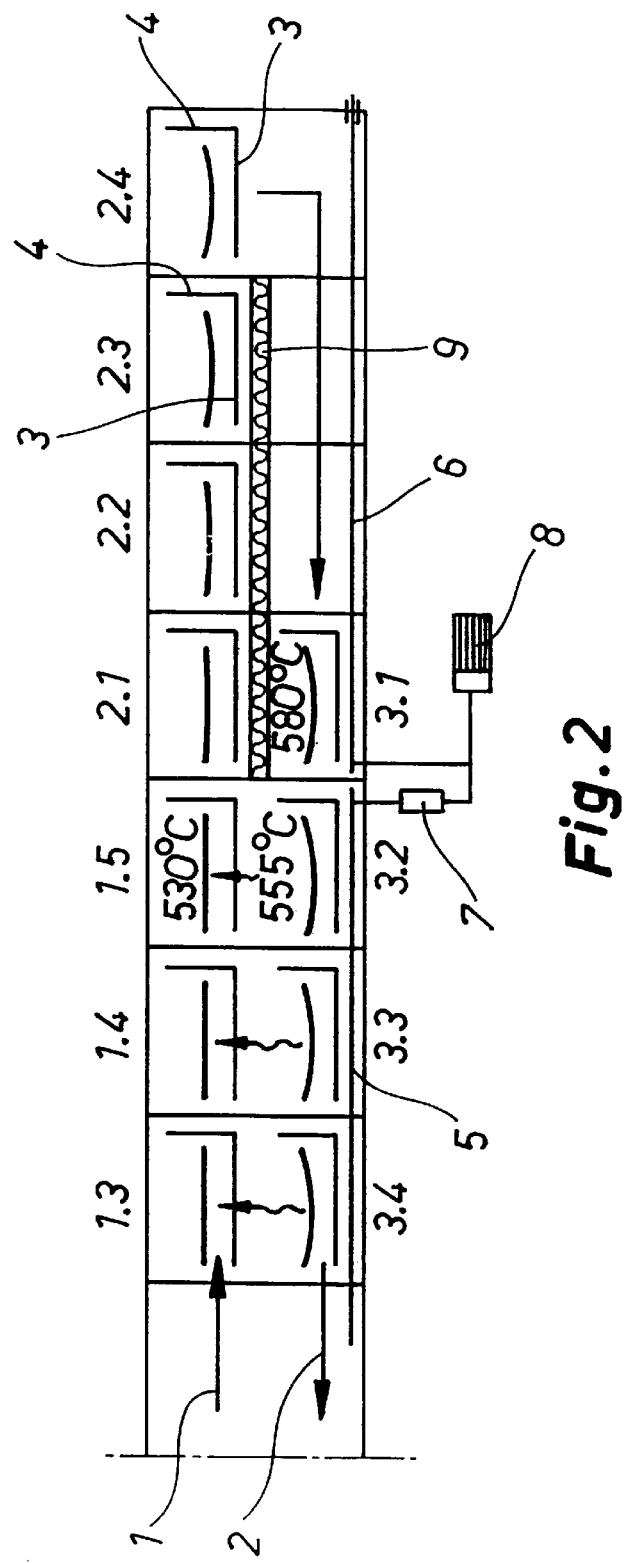

The invention will now be described in more detail with reference made to the accompanying drawing, in which FIG. 1 shows a prior art bending furnace in a schematic axial and vertical section and FIG. 2 shows a bending furnace of the invention the same way as FIG. 1.

The furnace includes a number of mould-carrying wagons 3, 4 on an upper track 1 and a second number of mould-carrying wagons on a lower track 2. The mould-carrying wagons are provided with an at least partially open floor 3 and a single end wall 4 for separating successive stations or blocks from each other, when the mould-carrying wagons 3, 4 are stationary. The upper track 1 is provided with a number of successive preheating stations 1.3, 1.4, 1.5 and more than two bending stations 2.1, 2.2, 2.3, 2.4. Below the upper track stations lies a number of cooling stations 3.1, 3.2, 3.3, 3.4. The upper track 1 and the lower track 2 are separated from each other by an insulated floor 9 extending across the bending stations 2.1, 2.2, 2.3.

Having been bent in the final bending station 2.4, a pair of glass sheets is descended by means of a hoist or lift onto the lower track 2, the wagon 3, 4 being carried therealong to a position directly below the first bending station 2.1. Alternatively, the wagon can even be shifted to a position directly below the final preheating station 1.5. During this transfer, the glass has not enough time for excessive cooling prior to its arrival below the final preheating station 1.5. In the present exemplary case, the glass in the final preheating station 1.5 has a temperature of 530° C. and that of the cooling station therebelow is 555° C. These temperatures correlate well with the air temperature within the stations immediately after a transfer of wagons. Thus, warm air is flowing also within the domain of station 1.5 from lower track to upper track through the wagon floor or around its sides.

Transfer of the wagon 3, 4 from below the bending station 2.4 to below the bending station 2.1 is effected while the other wagons are stationary for creating preheating, bending and cooling stations. Thus, the total number of wagons is also reduced by 1–3 wagon, as the case may be. In order to enable a wagon transfer of the invention, the drive shaft for transfer rollers of wagons on the lower track 2 is divided into two shaft sections 5 and 6. A motor 8 is used for driving the shaft section 6 directly and the shaft section 5 through the intermediary of a clutch 7. A transfer of the invention is effected by driving the shaft 6 while the clutch 7 is open, at which time the shaft 5 is not rotating. When all wagons are carried over a single interstation distance from one station to the next, the clutch 7 is closed and, thus, also the wagon located in the station 3.1 transfers into the station 3.2 as the motor 8 drives both shafts 5 and 6.

Thus, an arrangement of the invention is capable of achieving an intensified recovery of waste heat in a furnace with more than two bending stations. In addition, the glass cooling rate can be regulated below the bending stations 2.1–2.3 by adjusting the travelling speed of a wagon transfer. Yet another advantage is that a lift compartment located below the bending station 2.4 remains sufficiently cold for creating an edge stress for the glass as the cold air flows around the glass edges when descending the glass from the bending station onto the lower track.

I claim:

1. A method for transferring mould-carrying wagons in a bending furnace for glass sheets, said method comprising the steps of:

preheating the glass sheets in at least one preheating station, said preheating station being at least partially formed of one of a plurality of mould-carrying wagons, said mould-carrying wagons being adapted to transfer the glass sheets successively through each said preheating station;

bending the glass sheets in more than two bending stations, and bending stations being arranged successively after said preheating station and each said bending station being at least partially formed of one of said plurality of mould-carrying wagons, said mould-carrying wagons being adapted to transfer the glass sheets from said preheating stations and successively through said bending stations;

cooling the glass sheets in a plurality of cooling stations, each said cooling station being at least partially formed of one of said plurality of mould-carrying wagons, said mould-carrying wagons being adapted to transfer the glass sheets from said bending stations and successively through said cooling stations, said cooling stations being arranged successively below said preheating stations and no more than one of said bending stations such that heat from the glass sheets in each said cooling station is utilized to at least partially preheat the glass sheets in said preheating stations; and transferring said mould-carrying wagons from said bending stations to said cooling stations at a second rate faster than a first rate at which said mould-carrying wagons progress through said preheating stations, said bending stations and said cooling stations.

2. The method for transferring mould-carrying wagons as recited in claim 1, wherein said transferring step further comprises:

transferring said mould-carrying wagons from said bending stations to said cooling stations at a second rate approximately equal to said first rate times the quantity of the number of said bending stations minus one.

3. The method for transferring mould-carrying wagons as recited in claim 1, wherein said transferring step further comprises:

transferring said mould-carrying wagons from said bending stations to said cooling stations at a second rate approximately equal to said first rate times the number of said bending stations.

4. The method for transferring mould-carrying wagons as recited in claim 1, wherein said transferring step further comprises:

allowing at least one said mould-carrying wagon to progress between said bending stations and said cooling stations; and holding the remaining said mould-carrying wagons substantially stationary in said preheating stations, said bending stations and said cooling stations while said at least one mould-carrying wagon progresses between said bending stations and said cooling stations.

5. The method for transferring mould-carrying wagons as recited in claim 4, wherein:

said allowing step further comprises driving a second set of rollers, said second set of rollers being adapted to transfer said mould-carrying wagons between said bending stations and said cooling stations; and said holding step further comprises disengaging a first set of rollers, said first set of rollers being adapted to transfer said mould-carrying wagons successively through said preheating stations, said bending stations and said cooling stations.

6. The method for transferring mould-carrying wagons as recited in claim 5, wherein:

said first set of rollers is driven by a first drive shaft and said second set of rollers is driven by a second drive shaft, said first and second drive shafts being driven by a common motor.

7. The method for transferring mould-carrying wagons as recited in claim 5, wherein said holding step further comprises:

engaging a clutch to said first drive shaft to prevent operation of said first set of rollers while said common motor operates said second set of rollers through said second drive shaft.

8. An improved transfer mechanism for mould-carrying wagons in a furnace for bending glass sheets, the furnace having a plurality of glass sheet preheating stations, more than two glass sheet bending stations and a plurality of glass sheet cooling stations, wherein the preheating stations and the bending stations are successively arranged on a first level within the furnace and the cooling stations are successively arranged on a second level, substantially beneath the first level, within the furnace such that heat from glass sheets within the cooling stations may be utilized to warm glass sheets within the preheating stations and bending stations, said improved transfer mechanism comprising:

a first set of rollers, driven by a first drive shaft from a motor, said first set of rollers being adapted to transfer the mould-carrying wagons successively through the preheating stations, the bending stations and the cooling stations;

a second set of rollers, driven by a second drive shaft from said motor, said second set of rollers being adapted to transfer the mould-carrying wagons between a final bending station on the first level within the furnace and a first cooling station on the second level within the furnace, said first cooling station being located directly beneath one of a final preheating station and a first bending station; and a clutch in said first drive shaft for disengaging said first set of rollers while said motor operates said second set of rollers through said second drive shaft, thereby transferring at least one of the mould-carrying wagons beneath and past all but one of the bending stations while the remaining mould-carrying wagons remain substantially stationary within the preheating stations, the bending stations and the cooling stations.

* * * * *